US009069870B2

(12) United States Patent
Howard et al.

(10) Patent No.: US 9,069,870 B2
(45) Date of Patent: Jun. 30, 2015

(54) CLIENT-SIDE AGGREGATION OF CONTEXT-SENSITIVE REQUEST RESULTS WHERE RESULTS FOR AGGREGATION ARE ASYNCHRONOUSLY PRODUCED BY MULTIPLE SERVERS

(75) Inventors: Curtiss J. Howard, Raleigh, NC (US); Todd E. Kaplinger, Raleigh, NC (US); Stephen J. Kenna, Morrisville, NC (US); Erinn E. Koonce, Durham, NC (US); Maxim A. Moldenhauer, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2120 days.

(21) Appl. No.: 11/843,038

(22) Filed: Aug. 22, 2007

(65) Prior Publication Data
US 2008/0016151 A1 Jan. 17, 2008

Related U.S. Application Data

(63) Continuation-in-part of application No. 11/533,103, filed on Sep. 19, 2006, now abandoned.

(51) Int. Cl.
G06F 15/16 (2006.01)
G06F 17/30 (2006.01)
H04L 12/24 (2006.01)

(52) U.S. Cl.
CPC ......... G06F 17/3089 (2013.01); H04L 12/2498 (2013.01)

(58) Field of Classification Search
CPC .................................................. G06F 17/3089

USPC ....................................................... 709/203
See application file for complete search history.

(56) References Cited

U.S. PATENT DOCUMENTS 5,944,779 A 8/1999 Blum
6,112,243 A 8/2000 Downs et al.
(Continued)

FOREIGN PATENT DOCUMENTS

JP 2000067012 A 3/2000
JP 2001109715 A 4/2001
(Continued)

OTHER PUBLICATIONS

"IBM"—Application No. 08786988.9-1507/2179376; Office action dated Nov. 15, 2013; pp. 1-11.

Primary Examiner — Asghar Bilgrami
(74) Attorney, Agent, or Firm — Patents on Demand P.A.; Brian K. Buchheit; Scott M. Garrett

(57) ABSTRACT

The present invention discloses a solution for handling HTTP requests for content produced asynchronously by multiple servers, where a requesting client aggregates content. In the solution, a client can issue a content request to a request receiving server. The content request can define a request context. The request receiving server can deliver initial content including placeholders to the client, can issue asynchronous requests to multiple placeholder content servers, and can thereafter terminate threads/processes and can free resources involved in handling the request context. Each of the placeholder content servers can process one of the asynchronous requests and can convey placeholder content results to a result distribution service. The result distribution service can provide the client with the placeholder content. The client can aggregate the content from all sources.

20 Claims, 2 Drawing Sheets

(56) References Cited

U.S. PATENT DOCUMENTS

| | | | |
|---|---|---|---|
| 6,505,257 B2 | 1/2003 | Murata et al. | |
| 6,651,143 B2 | 11/2003 | Mounes-Toussi | |
| 6,665,704 B1 | 12/2003 | Singh | |
| 6,961,776 B1 * | 11/2005 | Buckingham et al. | 709/229 |
| 6,963,917 B1 | 11/2005 | Callis et al. | |
| 7,051,330 B1 | 5/2006 | Kaler et al. | |
| 7,127,713 B2 * | 10/2006 | Davis et al. | 717/177 |
| 7,130,885 B2 * | 10/2006 | Chandra et al. | 709/206 |
| 7,209,915 B1 | 4/2007 | Taboada et al. | |
| 7,398,301 B2 | 7/2008 | Hennessey et al. | |
| 7,447,731 B2 * | 11/2008 | Calo et al. | 709/201 |
| 7,490,343 B1 | 2/2009 | Gordon et al. | |
| 7,496,554 B2 | 2/2009 | Kaplan | |
| 7,502,760 B1 | 3/2009 | Gupta | |
| 7,536,472 B2 | 5/2009 | O'Neal et al. | |
| 7,590,752 B2 | 9/2009 | van Oldenborgh et al. | |
| 2002/0111814 A1 | 8/2002 | Barnett | |
| 2004/0017395 A1 | 1/2004 | Cook | |
| 2004/0103413 A1 | 5/2004 | Mandava et al. | |
| 2004/0117801 A1 | 6/2004 | Eibach et al. | |
| 2004/0205108 A1 | 10/2004 | Tanaka | |
| 2004/0264385 A1 | 12/2004 | Hennessey et al. | |
| 2005/0044233 A1 * | 2/2005 | Cai et al. | 709/227 |
| 2005/0125508 A1 | 6/2005 | Smith et al. | |
| 2005/0198118 A1 | 9/2005 | Viger | |
| 2007/0143460 A1 | 6/2007 | Ben-David et al. | |
| 2007/0156876 A1 | 7/2007 | Sundarrajan et al. | |
| 2007/0226342 A1 | 9/2007 | Apelbaum | |
| 2008/0059499 A1 | 3/2008 | Parkinson et al. | |
| 2008/0071922 A1 | 3/2008 | Chetuparambil et al. | |
| 2008/0127234 A1 | 5/2008 | Hesmer et al. | |
| 2008/0183825 A1 | 7/2008 | Alicherry et al. | |
| 2009/0063618 A1 | 3/2009 | Chetuparambil et al. | |

FOREIGN PATENT DOCUMENTS

| | | |
|---|---|---|
| JP | 2003141072 A | 5/2003 |
| JP | 2004000018 A | 1/2004 |
| JP | 2006311013 A | 11/2006 |

* cited by examiner

CLIENT-SIDE AGGREGATION OF CONTEXT-SENSITIVE REQUEST RESULTS WHERE RESULTS FOR AGGREGATION ARE ASYNCHRONOUSLY PRODUCED BY MULTIPLE SERVERS

CROSS-REFERENCE TO RELATED APPLICATIONS

This continuation-in-part application claims the benefit of U.S. patent application Ser. No. 11/553,103, filed Sep. 19, 2006, and the benefit of U.S. patent application Ser. No. 11/846,423, filed Aug. 28, 2007, which are incorporated by reference herein.

BACKGROUND

1. Field of the Invention

The present invention relates to HTTP request handling and, more particularly, to client-side aggregation of context-sensitive request results where results for aggregation are asynchronously produced by multiple servers.

2. Description of the Related Art

In an application server architecture, requests are made for resources (URLs) that often include a set of operations to be performed, such as includes or forwards to other resources. Generally, a small percentage of the operations are expensive in terms of incurred delay. The synchronous nature of a conventional request lifecycle causes a delay incurred by one operation to affect throughput as a whole. Additionally, resources of the server that are primarily responsible for handling a request are tied-up until the request-context has been entirely processed and a response conveyed to a requesting client. Further, the requesting client does not receive a response to their request until the primary server has aggregated responses from all operations, which execute sequentially.

Current solutions to the above problem include utilizing frames or server side includes (SSI), where each portion of a requested Web page is associated with a separate distinct request from a client. Use of frames and SSIs, however, results in an inability to share context related to the original request among the separate distinct requests. Sharing context among these requests is highly desired because the operations called by the requests need access to the original request information sent by the client or set in the processing before dispatch.

U.S. patent application Ser. No. 11/456,905 disclosed a solution for aggregating content from different container types and languages with shared request context synchronously. That is, the referenced solution provided an extensible framework that allows a Remote Request Dispatcher (RRD) to handle portlets and other containers. This technology permits a server to distribute request handling operations across a set of servers. Thus, a single request-context is handled by multiple servers. The disclosed solution, however, still requests that a primary server waits for remote content to return, de-serializes it, and return serialized responses, which occur synchronously.

US patent application Ser. No. 11/846,423 disclosed a solution for client side aggregation of asynchronous context-sensitive request operations in a single application server environment. This solution solved a problem of a server or proxy being responsible for aggregating operation results, which can be costly in terms of memory and request processing resources. Instead, US patent application Ser. No. 11/846,423 offloads aggregation responsibility to a client. This client-side aggregation, however, was limited to a single server and was not able to pass request context to multiple servers.

The problem solved by the present invention is that of asynchronously aggregating remote content from multiple servers within the same request context. There does not appear to be any known solutions to this problem as even the concept of aggregating content from different container types and languages with shared request context (e.g., U.S. patent application Ser. No. 11/456,905) is considered unique, as is the concept of client-side aggregation of asynchronous context-sensitive request operations (e.g., U.S. patent application Ser. No. 11/846,423).

SUMMARY OF THE INVENTION

The present invention discloses a solution for client-side aggregation of context-sensitive request results where results are asynchronously handled by multiple servers. In the solution, a client can request a piece of content from a public server, where the requested content is an aggregation of several pieces of remote content. The remote content can optionally be provided by non-public servers. The public server can return content to the client, which contains one or more placeholders. The public server can then initiate one or more asynchronous processes/threads to remote servers, each of which is responsible for providing content for a placeholder. Once each of the remote servers is finished processing content, which is still part of the same request context, the content can be conveyed to a result distribution service. The client can send queries to the result distribution service, one query for each placeholder. As placeholder content becomes available, it can be conveyed to the client by the service. The client can complete a portion of a presented Web page associated with the service provided content as it is received. Other portions of the presented Web page do not need to be updated.

The disclosed solution has clear advantages over conventional technologies and over U.S. patent application Ser. No. 11/533,103 and U.S. patent application Ser. No. 11/846,423. Specifically, all RequestDispatcher includes initiated by the originating server are handled asynchronously by multiple servers and a load is distributed evenly among the requesting client and the content processing or providing servers, which allows for greater throughput than any known solution. The client receives content in stages as soon as it is available, which enhances a user's experience. A request receiving server is not burdened with aggregating content from multiple remote servers and is not forced to expend memory or other limited resources for the duration of a request context. Rather, once the request receiving server has conveyed content with placeholders to a client and spawned threads for placeholder content to other servers, the request receiving server is through with its portion of the request context. The result distribution service can be any component able to service RESTful (e.g., HTTP) requests, such as a servlet, a Java Service Page (JSP), an ASP, and ESB component.

The present invention can be implemented in accordance with numerous aspects consistent with the material presented herein. For example, one aspect of the present invention can include a method for handling client request within a request context. The method can include a step of a client issuing a content request to a request receiving server. The content request can define a request context. The request receiving server can deliver initial content including placeholders to the client can issue asynchronous requests to multiple placeholder content servers, and can thereafter terminate threads/processes and can free resources involved in handling the request context. Each of the placeholder content servers can process one or more of the asynchronous requests and can convey placeholder content results to a result distribution service. The result distribution service can provide the client with the placeholder content. The client can aggregate the content from all sources.

Another aspect of the present invention can include a system for handling client requests for a request context that includes a client configured to convey a content request to a remotely located content server. The content request can define a request context. Request results can be presented within the interface of the client. The request results can include content produced by two or more servers that each asynchronously perform operations to produce that server's content. The client can aggregate the content from the content producing servers.

Still another aspect of the present invention can include a result distribution service, used in a system that handles content requests processed by multiple services, where the content requests are aggregated by a client. The result distribution service can receive and store results related to a request context from one or more different content providing servers. The result distribution service can also receive asynchronous requests from a client, which initiated a content request that defines the request context. In response to each received client request, the result distribution service can provide the stored results obtained from the content providing servers to the client as these results become available to the service.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
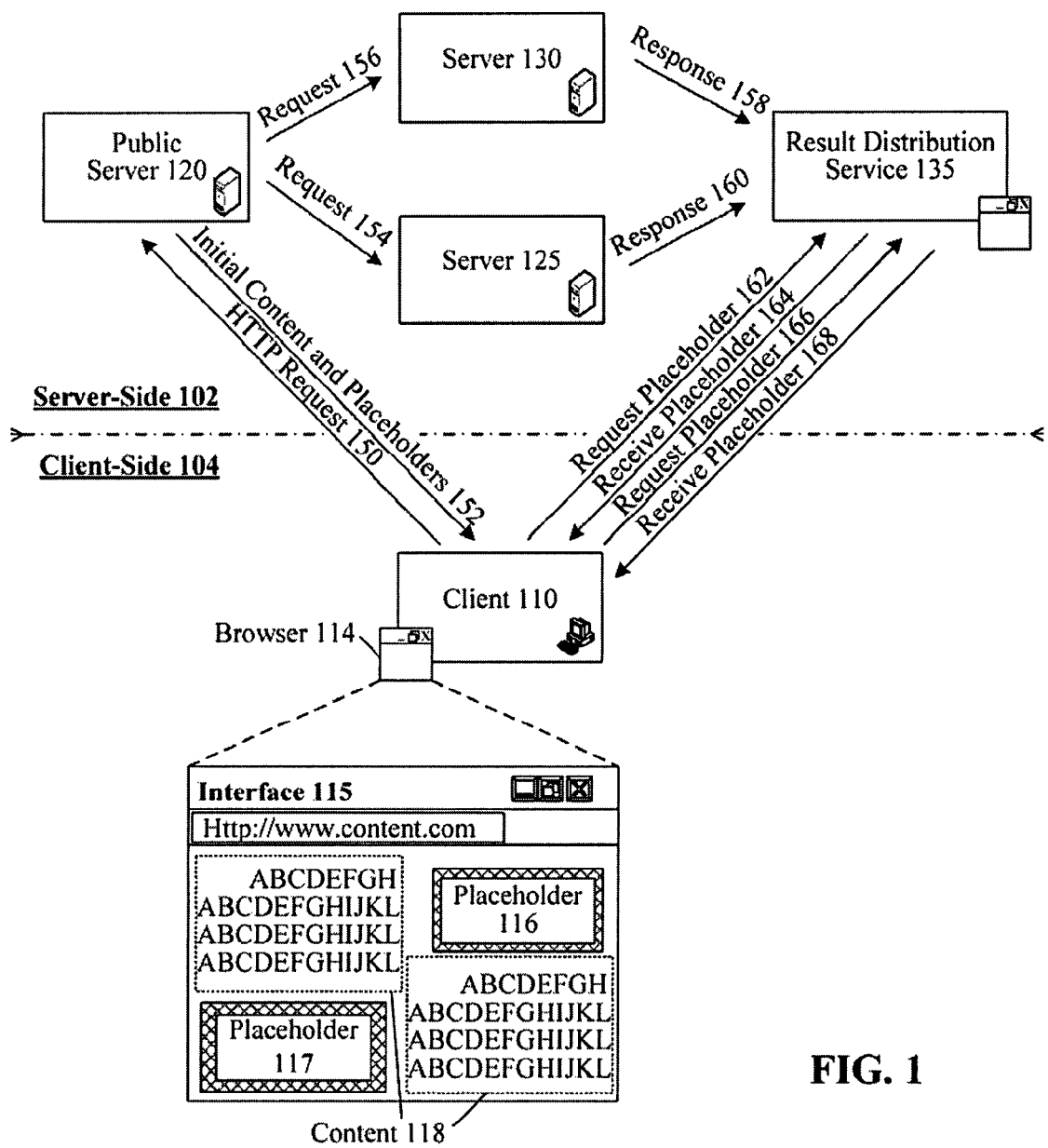
FIG. 1 is a schematic diagram of a system for client-side aggregation of context-sensitive request results, where results are asynchronously handled by multiple servers

FIG. 1 is a schematic diagram of a system 100 for client-side aggregation of context-sensitive request results, where results are asynchronously handled by multiple servers. In system 100, a browser 114 of a client 110 can request 150 content from a server-side 102 public server 120. The server 120 can provide a portion of the content fulfilling the request 150 and other servers, such as server 125 and/or 130, can provide content for another portion of the request 150. The server 120 initiates asynchronous requests 154 and 156 to servers 125 and 130. Server 120 will convey content, possibly including placeholders 152, back to the client 110. The client 110 can immediately present content 118 returned by response 152 within interface 115. A set of placeholders 116, 117 can be included in the content, where the placeholders 116-117 are associated with content, which will result from asynchronous threads 154 and 156.

The server 120 at this point has completed it's handling of the request 150 and can release any and all resources and stored content dedicated to handling the request 150. That is, an original request 150 handling thread/process is freed-up since additional results generated by servers 125-130 (e.g., placeholder 116, 117 filler content) are later retrieved by other requests 162, 166 from the result distributing service 135.

The server 125 can process the asynchronous request 154 and provide a result 160 to the result distributing service 135. Similarly, the server 130 can process asynchronous request 156 and provide result 158 to the result distributing server 135. Once each of the servers 125 and 130 has provided request results 158 or 160, that server 125 or 130 has completed tasks required of it for the request context. All threads/processes spawned to handle a request 154, 156 can be terminated and associated resources released.

The client 110 can asynchronously request 162 placeholder content (i.e., content for placeholder 116 provided by server 125) and can asynchronously request 166 placeholder content (i.e., content for placeholder 117 provided by server 130) from the result distribution service 135. When the requested 162, 166 content becomes available, the result distribution service 135 can deliver it to the client 110 as results 164 and 168. Upon receiving the results 164, 166, an associated placeholder 116 or 117 can be populated with the content by updating an interface 115 region associated with the results 164, 166. Other portions of the interface 115 need not be updated.

In system 100, the servers 120, 125, and 130 can be computing systems capable of handling Hypertext Transfer Protocol (HTTP) requests from a network and of providing HTTP responses to these requests. Each of the servers 120-130 can be associated with a Uniform Resource Identifier (URI) used for server 120-130 identification when conveying HTTP requests. The HTTP responses can include static and dynamic content. Typically, the initial content and placeholder 152 produced by server 120 will include static content and the placeholder content produced by the servers 125 and 130 will include dynamic content. Each of the servers 120, 125, and 130 can include numerous optional features, such as authentication support, encrypted channel support (e.g., HTTPS support through Transport Layer Security (TLS) technologies, Secure Sockets Layer (SSL) technology, and the like), content compression and decompression support, and the like. Each of the servers 120-130 can allocate resources to process a received request 150, 154, 156 and can release these resources once that server's processing tasks are completed. That is, a time period in which any of the servers 120-130 is used to handle the request context is less than a total time needed to handle the request context. The servers 120-130 can be implemented within physical machines as well as virtual computing devices, such as those provided through virtualization solutions (e.g., VMWARE, MS VIRTUAL SERVER, and the like).

One or more of the servers 125-130 can be private servers that are not directly accessible over a public network. The private servers can be firewall protected, can be part of a virtual private network (VPN) linked to the server 120, and can be part of a private network that server 120 is permitted to access. Each of the servers 125-130 can also be public servers. Although two servers 125-130 are shown in system 100 that provide placeholder content 116, 117, the invention is not to be limited in this regard and any number of placeholder content providing servers 125-130 can be utilized. Additionally, although system 100 shows that each request issued by server 120 is handled by a single server 125, 130, which provides results to service 135, other arrangements are contemplated. For example, server 125 can initially process request 154, convey results to an intermediate server (not shown) for further processing, and the intermediate server can send results to the service 135.

The result distribution service 135 can be a server-side 102 software program able to handle HTTP and other RESTful messages. For example, the result distribution server 135 can be implemented as a servlet, a JAVA Server Page (JSP), an Active Server Page (ASP), an Enterprise Java Bean (EJB), an Enterprise Service Bus (ESB) service, and the like. The service 135 can be associated with a URI to which the servers 125-130 can convey responses 158 and 160 and to which the client 110 can convey the requests 162, 166. The result distribution service 135 can reside within server 120, server 125-130, or any other server. When the service 135 is associated with a component other than the one addressed in the original HTTP request, then system 100 must implement measures to ensure that the URLs of the service 135 are available to the servers 125-130 and the client 110.

The client 110 can be any computing device capable of sending HTTP request 150 and capable of rendering responses to these requests. For example, the client 110 can include a personal computer, a notebook computer, a mobile computing device, a smart phone, a personal data assistant (PDA), an embedded computing device, an electronic gaming system, and the like. Client 110 can include a browser 114, which handles HTTP communications. The browser 114 can be linked to an interface 115 with which a user interacts with client 110. The interface 110 can be a graphical user interface (GUI), a multi-modal interface, a voice user interface (VUI), and the like. Interface 150 can include content 118 and placeholders 116, 117.

Each placeholder 116, 117 can be a container for Web content. Each placeholder 116, 117 can be filled with dynamically generated content. The placeholders 116, 117 can include widgets, portlets, and other types of content. In one embodiment, the placeholder stands in place of content from a remote request dispatcher (RRD) request. Initially, the placeholders 116, 117 can lack content. Each time a placeholder response 166, 168 is received, a related placeholder 116, 117 can be completed. The content 118 can be rendered, even when the placeholder 116, 117 content is unavailable. In one embodiment, the placeholders 116, 117 can be objects conforming to a browser object model (BOM) or any document object model (DOM).

In one implementation, the client-side 104 aggregation of content can occur in a user transparent fashion. For example, the browser 114 can be enhanced with a plug-in or extension that automatically submits the requests 162, 164 until responses 166, 168 are received. In one embodiment, the server 120 can convey an address of the service 135 to the client 110 and to the servers 125-130. so that each computing device is able to determine a target for requesting (e.g., client 110) and/or delivering (e.g., servers 125-130) content. In another embodiment, the public server 120 can convey a user identifying address to the servers 125-130, which are in turn conveyed to the service 135. The service 135 can then deliver results 166, 168 to the client 110 referenced by the address and/or the service 135 can then convey a message to the client 110 so that the client 110 knows where to send requests 162-164.

The various components of system 100 can be communicatively linked via a network (not shown). The network can include components capable of conveying digital content encoded within carrier waves. The content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Figure 2:
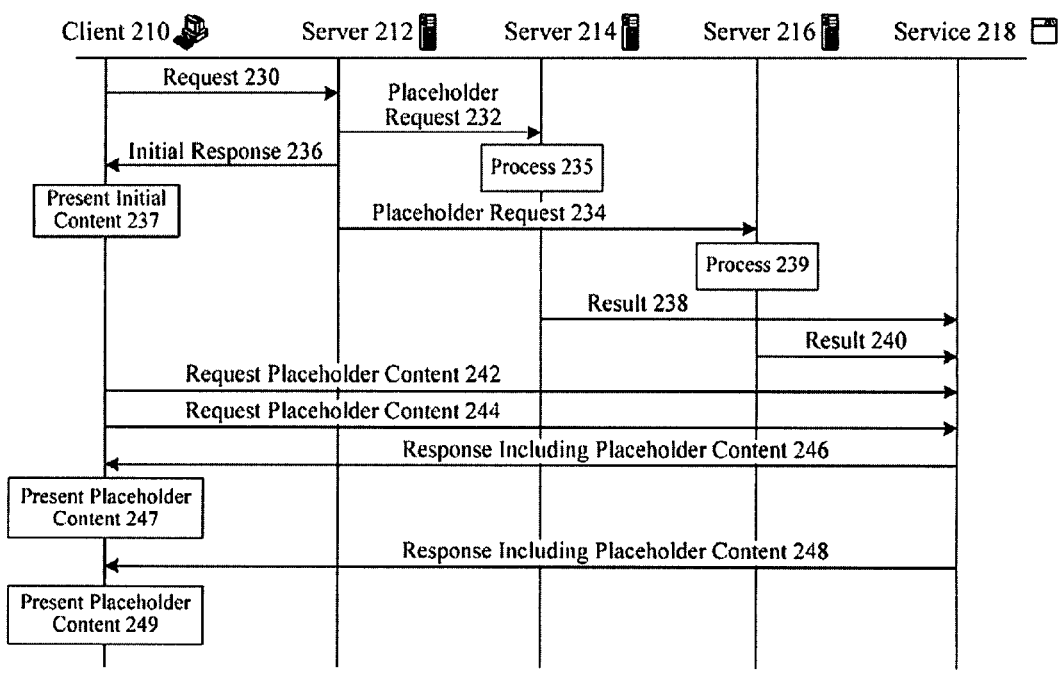
FIG. 2 is a process flow diagram in which a client aggregates content from multiple servers within a common request context through asynchronous messages in accordance with an embodiment of the inventive arrangements disclosed herein.

FIG. 2 is a process flow diagram 200 in which a client 210 aggregates content from multiple servers 212-216 within a common request context through asynchronous messages in accordance with an embodiment of the inventive arrangements disclosed herein. The process flow of diagram 200 can be performed in a context of a system 100 or approximately equivalent system.

In diagram 200, a client 210 can convey a request 230 to a server 212. The request can require content from the server 212 and from servers 214, 216. For example, the server 212 can provide static content for the request 230 and the servers 214-216 can provide dynamic content. The server 212 can establish a container or placeholder for each dynamic content segment. Then, the server 212 can generate and convey an asynchronous request 232 to server 214 for content relating to one of the containers. The server 212 can generate and convey a separate asynchronous request 234 for content relating to a different container to server 216. Additionally, the server 212 can send the static content 236 containing placeholders to the client 210, which can immediately present 237 the content including "blank" placeholders within an interface. At this point, processes/threads relating to request 230 can be terminated by server 212, which can free all resources related to handling request 230.

Server 214 can asynchronously process 235 request 232 and generate response 238, which is sent to service 218. Server 216 can process 239 request 234 and generate response 240, which is conveyed to service 218. Each server 214, 216 can terminate all processes/threads relating to request 230 and release related resources once that server 214, 216 has conveyed response 238 or 240 to service 218.

The client 210 can asynchronously and repetitively request 242, 244 content from the service 218, where the requested content is used to fill placeholders or containers. When request satisfying content is registered with the service 218, it can be provided 246, 248 to the client 210 in response to the related request 242, 244. Upon receiving the placeholder content 246 or 248, the client 210 can immediately render the content 246 or 248 and present 247 or 249 in an interface.

It should be appreciated that the details of flow diagram 200 are used herein to illustrate a technology for client side aggregation of a set of asynchronous operations performed by multiple servers in response to a single request context. Specific process flows of diagram 200 are to be construed liberally within the scope of the invention disclosed as a whole.

That is, the invention is not to be limited to the precise flow order shown and derivatives of the diagram 200 that serve an equivalent purpose are to be considered as included within the scope of the invention. For example, diagram 200 shows a request/response polling approach (242-248) for obtaining content from the service 218. In an alternative implementation still within scope of the invention, a subscription methodology can be used, where the client 210 subscribes with the service 218, and the service 218 automatically provides updated content 246-248 as per the subscription as the content becomes available.

The present invention may be realized in hardware or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for handling client requests within a request context comprising:
   a client issuing a content request to a request receiving server, said content request defining a request context;
   the request receiving server delivering initial content including placeholders to the client, issuing asynchronous requests to a plurality of placeholder content servers, and thereafter terminating threads/processes and freeing resources involved in handling the request context at the request receiving server;
   each of the placeholder content servers processing one of the asynchronous requests and conveying placeholder content results to a result distribution service;
   the result distribution service providing the client with the placeholder content; and
   the client aggregating the initial content and the placeholder content in an interface of the client.

2. The method of claim 1, wherein the content request is an HTTP request issued by a browser of the client, and wherein the initial content and the placeholder content is written in a markup language, wherein aggregated content is rendered within the browser.

3. The method of claim 1, wherein the request receiving server is a public Web server, and wherein at least one of the placeholder content server is a private server, which is not a publicly accessible Web server.

4. The method of claim 1, wherein the placeholders are each a container for Web content, wherein a remote request dispatcher (RRD) container is one type of container able to be used for one of the placeholders.

5. The method of claim 1, wherein the result distribution service is a server-side program configured to handle RESTful requests.

6. The method of claim 1, further comprising:
   the client repetitively issuing a set of requests to the result distribution service until the result distribution service responds to each request by providing corresponding placeholder content that satisfies the request, wherein the set of requests comprises a request for content for each of the placeholders.

7. The method of claim 6, further comprising:
   for each response including placeholder content received from the result distribution service by the client, the client refreshing a portion of an interface specific to the placeholder content so that the placeholder content is rendered within the interface.

8. The method of claim 1, wherein the aggregating step uses asynchronous messages and asynchronous aggregation operations when aggregating content.

9. The method of claim 1, wherein said steps of claim 1 are steps performed automatically by at least one machine in accordance with at least one computer program having a plurality of code sections that are executable by the at least one machine, said at least one computer program being stored in a machine readable medium.

10. A system for handling client requests for a request context comprising:
    a client configured to convey a content request to a remotely located content server, said content request defining a request context, the content server returning initial request results and placeholders containing no content, wherein initial request results and asynchronous request results are presented within an interface of the client, wherein the asynchronous request results include content to fill in the placeholders, the asynchronous request results being produced by a plurality of servers that each asynchronously perform operations in response to receiving an asynchronous request from the content server to produce each respective server's content, and wherein the client aggregates the content from the plurality of servers in the interface of the client.

11. The system of claim 10, further comprising:
    a result distribution service configured to receive results produced by the plurality of servers, wherein said result distribution service provides the results to the client within a set of asynchronous communications.

12. The system of claim 11, wherein said result distribution service is a server-side program configured to receive, process, and respond to RESTful requests.

13. The system of claim 11, wherein one of the plurality of servers is a request receiving server, wherein said request receiving server is configured to receive the content request and to initiate at least one process/thread to handle the request context, wherein the request receiving server conveys initial content and placeholders to the client which renders the initial content and placeholders upon receipt, wherein the request receiving server initiates a plurality of asynchronous placeholder content requests, one to each of the plurality of servers responsible for providing content to result distribution server, and wherein the at least one process/thread for handling the request context are terminated and associated resources freed upon the request receiving server initiating the asynchronous placeholder content requests and upon conveying the initial content and placeholders to the client.

14. The system of claim 11, wherein requests for the request context are asynchronously received by the client and are asynchronously rendered within the interface of the client upon receipt, wherein the request content comprises initial content comprising placeholders that is produced and conveyed to the client by a request receiving server, and wherein the request content comprises placeholder content produced by a set of remote servers responsive to a set of asynchronous content requests initiated by the request receiving server, wherein the remote servers provide their results to the result distribution service.

15. A result distribution service comprising a set of machine readable instructions stored in a non-transitory machine readable medium, wherein said set of machine readable instructions are executable by at least one machine causing the at least one machine to perform the steps of:
   receiving and storing results related to a request context from a plurality of different content providing servers;
   receiving a plurality of asynchronous requests from a client, which initiated a content request that defines the request context; and
   responsive to each received client request, providing stored results obtained from the content providing servers to the client as the results become available;
   wherein the results are used by the client to fill empty placeholders at the client, and wherein the client aggregates the results received from the result distribution service with initial results received at the client in response to the content request.

16. The result distribution service of claim 15, wherein the result distribution service is a software program configured to respond to RESTful requests.

17. The result distribution server of claim 15, wherein said service is a server-side program configured to handle RESTful requests.

18. The result distribution service of claim 15, wherein each of the received results is conveyed to the result distribution service within asynchronous HTTP messages, wherein each of the asynchronous requests from the client are specified within asynchronous HTTP messages, wherein the stored results are provided to the client within asynchronous HTTP messages.

19. The result distribution service of claim 15, further comprising:
   when storing the results, associating each result with an identifier of a client which originally issued a content request that defines the request context;
   checking an identifier of a client from which the asynchronous requests are received against the associated identifier; and
   only providing the stored results when the checked identifier matches the associated identifier.

20. The result distribution service of claim 15, wherein a request receiving server initially receives the content request from the client, conveys a set of initial content that includes a plurality of placeholders to the client, and spawns a plurality of asynchronous requests, which cause the content providing servers to produce the results that are conveyed to the result distribution service.

* * * * *